United States Patent [19]

Heimling et al.

[11] Patent Number: 5,456,727
[45] Date of Patent: Oct. 10, 1995

[54] DYE COMPOSITIONS FOR POLYAMIDES

[75] Inventors: Walter Heimling, West Warwick; Mark Helle, Hope; Kerry Proulx, Coventry, all of R.I.; Leslie McIntosh, Charlotte, N.C.; Philomen DeCroos, Coventry, R.I.

[73] Assignee: Hoechst Celanese Corporation, Somerville, N.J.

[21] Appl. No.: 248,292

[22] Filed: May 24, 1994

[51] Int. Cl.⁶ .......................... D06P 1/384; C09B 62/51; C09B 62/513; C09B 62/515

[52] U.S. Cl. .......................... 8/549; 8/641; 8/662; 8/682; 8/683; 8/685; 8/687; 8/924

[58] Field of Search .......................... 8/549, 641, 681, 8/682, 685, 686, 683, 684, 687, 924

[56] References Cited

U.S. PATENT DOCUMENTS

| | | | |
|---|---|---|---|
| 3,907,495 | 9/1975 | Meininger | 8/39 |
| 4,036,825 | 7/1977 | Fuchs et al. | 260/196 |
| 4,066,638 | 1/1978 | Fuchs et al. | 260/196 |
| 4,134,887 | 1/1979 | Fuchs et al. | 260/205 |
| 4,315,865 | 2/1982 | Hoyer et al. | 260/373 |
| 4,402,704 | 9/1983 | Raisin et al. | 8/641 |
| 4,445,905 | 5/1984 | Schaetzer | 8/641 |
| 4,652,269 | 3/1987 | Bowles et al. | 8/641 |
| 5,092,905 | 3/1992 | Doré | 8/638 |

FOREIGN PATENT DOCUMENTS 0586331  3/1994  European Pat. Off. ............ 62/503

Primary Examiner—Margaret Einsmann
Attorney, Agent, or Firm—Hugh C. Crall

[57] ABSTRACT

The invention is a dye composition containing two or more dyes of the vinyl sulfone type which can be used in combination to dye polyamide substrates. Preferably the dye compositions of the invention contain at least three dyes of different primary colors.

4 Claims, No Drawings

DYE COMPOSITIONS FOR POLYAMIDES

BACKGROUND OF THE INVENTION

1. Technical Field

This invention is directed to dye mixtures to dye and print natural and synthetic polyamides.

2. Background

The invention relates to dichromatic and trichromatic dyestuff compositions for dyeing polyamides. Commercial dyeings are normally made using several component dye mixture in order to obtain the desired shade and color depth. These dye mixtures comprise dyes selected from the primary colors; i.e. a yellow, a blue and a red dye. The individual dyes must be suitable for combination dyeing in trichromatic systems; i.e. blends two or more dyes containing the primary colors mixed predetermined amounts to give the desired shade. Suitable dyes in admixture must also produce a uniform color build-up and simultaneously a uniform shade at different dye bath concentrations in order to produce a dye having an acceptable appearance. In addition, the dye composition must give a dyeing having acceptable fastness properties at an acceptable cost.

In commercial practice, polyamide fibers are dyed by the exhaust, continuous, and printing methods using acid dyes. An illustrative trichromatic, acid dye system is a mixture of a C.i. (Color Index) Acid Orange 156, C.I. Acid Blue 324, and C.I. Acid Red 266. Although, these systems have gained acceptance in the dyeing of polyamides, they lack certain desired characteristics, e.g. on tone build-up, cold strike rate, ozone and nitrous oxide resistance, little or no phototropism and cold water solubility.

Various attempts have been made to use dyes containing the vinyl sulfone group to dye nylon. However, these dyes have not gained commercial acceptance in the dyeing of polyamide primarily due to their failure to give a uniform level dyeing with the above described properties. The vinyl sulfone dyes tend to selectively concentrate on one portion of the fiber leaving other portions deficient in that color either due variations in the fiber's morphology or the strike rate of the dye or a combination of both. This problem is particularly evident in the dyeing of polyamide materials where the fiber is highly extended, for example, in nylon carpets and rugs.

Various attempts have been tried to overcome disadvantages of the vinyl sulfone dyes in polyamide dyeing applications. U.S. Pat. No. 4,762,524 is an example of the prior art. In this prior art patent, a reaction product of the vinyl sulfone dye and an N-alkyl-amino-alkyl sulfonic or carboxylic acid is formed in an attempt to make the vinyl sulfone dye more suitable for polyamide dyeings. U.S. Pat. No. 3,802,837 teaches to form a reaction product of N-methyl-taurine to adapt the vinyl sulfone dye to polyamide dyeing. Although the above identified prior art teaches improved dyeing characteristics, they have not been accepted in the commercial dyeing of polyamides.

This invention is directed to a simple method of overcoming the problems of the prior art without resorting to modification of the chemical structure of vinyl sulfone dyes.

It has been found, that the compositions of this invention provide the stated requirement and provide superior polyamide dyeing with excellent fastness, low phototropism, high ozone and nitrous resistance.

SUMMARY OF THE INVENTION

This invention is a vinyl sulfone dye composition wherein the components of the dye component are selected from dyes of the following formula:

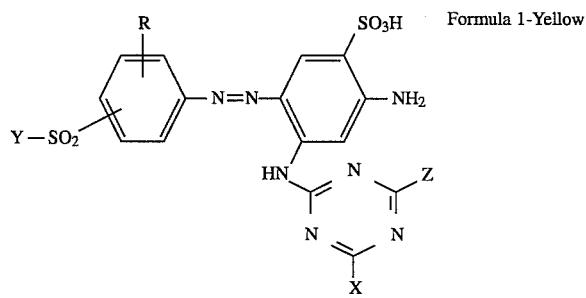

Formula 1-Yellow

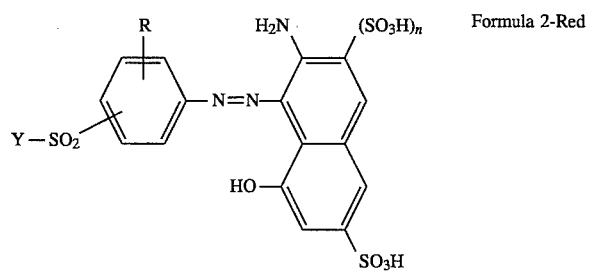

Formula 2-Red

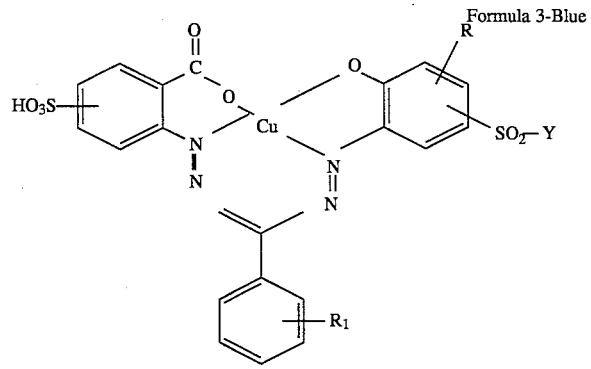

Formula 3-Blue

In the above formulae, R and $R_1$ are independently selected from Cl, $OCH_3$, $CH_3H$, and $SO_3H$; Y is selected from Vinyl, β-Sulfatoethyl, β-Thiosulfatoethyl, β-Phosphatoethyl, β-Chloroethyl, and $R_2$, $R_3N$—$CH_2$—$CH_2$. wherein $R_2$ and $R_3$ are independently selected from $CH_3$, $C_2H_4SO_3H$, $C_2H_4OH$, $C_2H_5$, and $CH_2$—COOH; X and Z are independently selected from —NHCN, and Cl and n is an integer selected from 0 or 1. Preferably the substituent R is hydrogen or methoxy ($OCH_3$); Y is the β-sulfatoethyl group; X and Z are chlorine or cyanamide (NHCN) and n is zero. The dyes of the above formula may be used in dichromatic and trichromatic dye compositions in amounts of 0–95% of each dye; preferably trichromatic dye compositions in an amount of 5–95% of each dye.

DESCRIPTION OF THE PREFERRED EMBODIMENTS

This invention is that of a water soluble dye composition useful in the dyeing of polyamides. Dichromatic and trichromatic dye compositions are selected from at least two dyes of the following formulae:

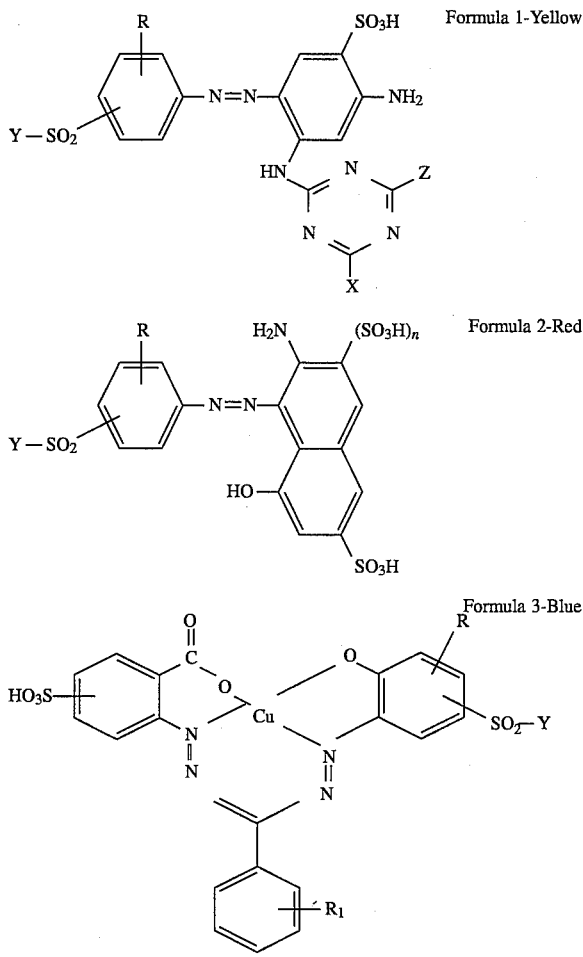

In the above formulae, R and $R_1$ are selected independently from Cl, $OCH_3$, $CH_3$, and H, $SO_3H$; Y is selected from Vinyl, β-Sulfatoethyl, β-Thiosulfatoethyl, β-Phosphatoethyl, β-Chloroethyl, and $R_2$, $R_3N$—$CH_2$—$CH_2$; wherein $R_2$ and $R_3$ are independently selected from $CH_3$, $C_2H_4SO_3H$, $C_2H_4OH$, $C_2H_5$, and $CH_2$—COOH; X and Z are independently selected from NHCN, and Cl and n is an integer selected from 0 or 1. Preferably the substituent R is hydrogen or methoxy ($OCH_3$); Y is the β-sulfatoethyl group; X and Z are independently selected from Cl and cyanamide (NHCN) and n is zero. The dyes of the above formula may be used in dichromatic and trichromatic dye compositions in amounts of 0–95% of each dye; preferably trichromatic dye compositions in an amount of 5–95% of each dye.

Dyes of the above formula are mostly known with their principal use being in the dyeing of cotton.

Polyamides useful in the practice of the invention include both the natural and synthetic polyamides. Examples of polyamides are silk, wool, nylon-6, nylon-6,6 and nylon-6/6,6 copolymers, nylon-11, nylon-12 and blends of such polyamides. The invention is particularly useful in the dyeing of nylon-6 and nylon 6-6 carpeting. The polyamide substrates in accordance with this invention may be combined with fibers of other polymers such as polyurethanes, polypropylene, polyethylene, polyester, rayon, etc. and in the form of fibers, yarns, fabrics or knitted goods, and especially in the form of carpets.

Dye compositions of the invention may be applied by conventional exhaust, continuous or printing methods well known in the art. The dyeing liquor or printing paste can contain typical dyeing auxiliaries, such as wetting agents, antifoaming agents, leveling agents, retarders, acids, buffers etc. and other agents affecting the properties of the textile material, for example softening agents, additives for imparting a flame retardant finish, dirt, water and oil repelling agents, as well as water-softening agents and natural or synthetic thickeners, for example alginates, cellulose ethers and the like.

Preferably the dye compositions of the invention are trichromatic dye compositions. Preferred dyes are the following dyes:

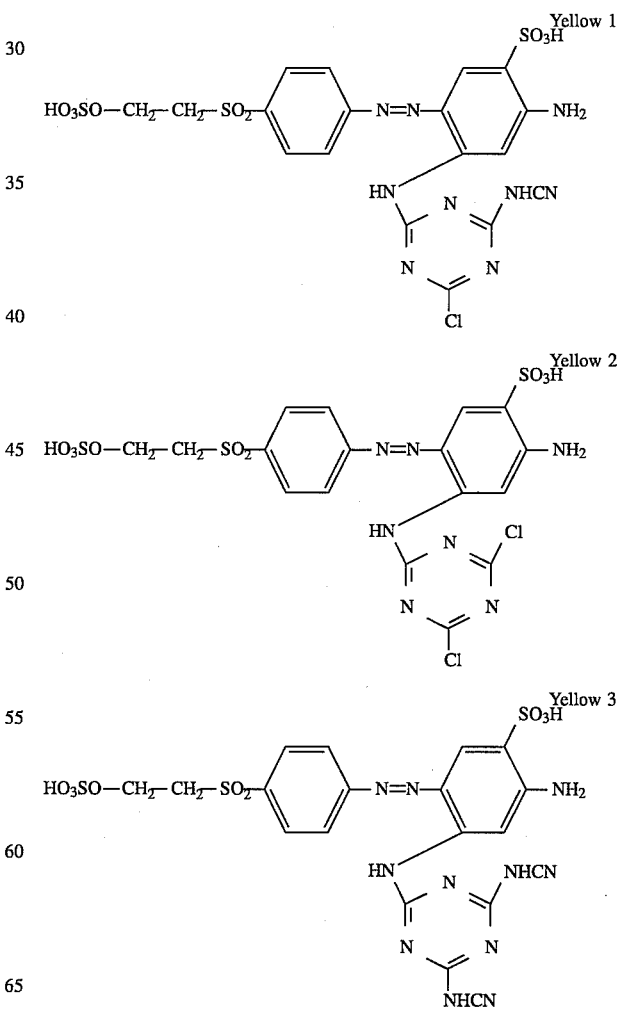

-continued

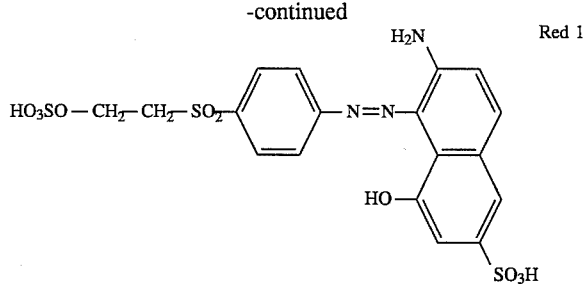
Red 1

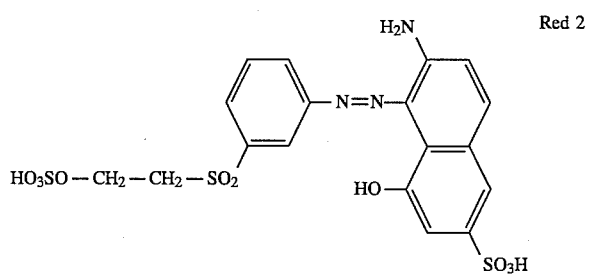
Red 2

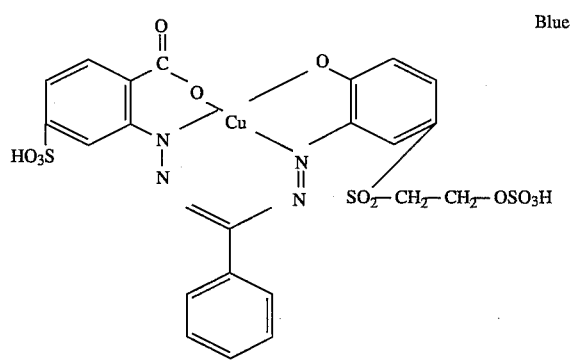
Blue 1

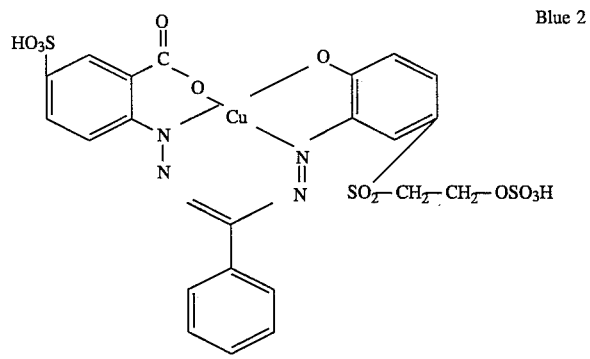
Blue 2

The dyes of the invention are showing surprisingly and unexpected an excellent compatibility and in the case of a trichromatic dyeing or printing, an excellent, uniform color build-up, by good strike and exhaustion properties and good constancy of shade at various concentrations and shades.

Also, the dyeings based on these dyes are showing a very high level of fastness properties in particular ozone and nitrous oxide fastness and very little phototropism, which is superior compared to the present used acid dyes. In addition, the cold water solubility of the individual dyes and also of the mixtures is excellent and even after several days, highly concentrated solutions do not show any dyestuff precipitation, which would affect the dyeing process.

The dyes of the invention may be used in free acid or salt form or preferably in their salt form. Suitable salts are for example the alkali metal, alkaline-earthmetal or ammonium salts, or the salts of an organic amine; e.g. the salts of sodium, lithium, potassium ammonium and triethanolamine. The dye mixtures of the invention contain as a rule further additives, for example sodium chloride, sodium sulfate or dextrin which are used to adjust their tinctorial strength to a standard level.

Blue 2 and similar dyes are described in the German Patent DE 1719083. Blue 1 is new and has not been described before. The synthesis of this dye can be done by following the procedures of the mentioned patent by using the appropriate intermediates.

The following examples illustrate the invention and are not intended to limit the scope of the claims of the invention. In the examples, the following trade names and abbreviations are used:

(1) Hostapur® CX wetting agent (an alkyl polyglycol ether)

(2) Remol® AN leveling agent (a quarternan/ammonium salt of C12 to C 16 amine )

(3) DOSS-70 wetting agent (dioctylsulfosuccinate)

(4) DOW FAX® 2A1 (an anionic leveling agent)

Items (1–3) above are available from Hoechst Celanese Corporation, Somerville, N.J. and Item (4) from Dow Chemical Company, Midland, Mich.

Percentage listed in the examples are weight percent based on the weight of fabric unless otherwise noted.

EXAMPLE 1

A 20 g piece of nylon-6 carpet was dyed in an aqueous dye bath containing the following components:

Yellow 1—0.370%

Red 1—0.158%

Blue 1—0.72%

Remol® ANL—1.0%

DOW FAX ® 2A1—0.5%

8 g Ammonium acetate

The dyeing was conducted at a liquor ratio 20:1. The dye bath is adjusted to a pH of 4.5 at 80° F. The temperature of the bath is raised at a rate of 3 F/minute to 180° F. The bath is held at 180° F. for 30 minutes and then dropped and the carpet was rinsed in cold water and dried.

The resulting dyeing was a deep navy shade, which shows excellent levelness, light, ozone, nitrous oxide, pesticide, shampoo and wet and dry crock fastness. The dyeing shows also a good chlorine fastness and almost no phototropism.

On tone build-up during the dyeing was measured by removing a small sample of the dyed carpet at predetermined times and the shade measured. All samples were the same shade, meaning that the individual dyes have a very close strike rate and represent an ideal trichromatic system.

Synthesis of Blue 1

160 g of the hydrazone, which results by condensating 2-carboxy-phenylhydrazine- 5-sulfonic acid with benzaldehyde, is dissolved in 750 g of water and brought to pH 6–7 using an aqueous sodium hydroxide solution. The resulting solution, 127 g of copper sulfate is added and the pH maintained at 5–6 by using soda ash.

To this solution, an aqueous diazo suspension is added, which can be made by diazotizing 149 g 2-amino-4-(β-sulfatoethylsulfonyl)-phenol with an aqueous solution of sodium nitrite and sulfuric acid. The coupling reaction is run at pH 4–6 by maintaining the pH with soda ash. To finalize the reaction, the coupling mixture is heated up to 40°–80° C. at pH 2–6 for 5 hours. High performance liquid chromatography can be used in all steps to indicate the end of the reaction. The resulting dyestuff solution is clarified and spray dried. It results a blue dyestuff powder, which can be used to perform the stated trichromatic nylon dyeings.

The dyestuff in form of the free acid has the following formula: (max: 600 nm)

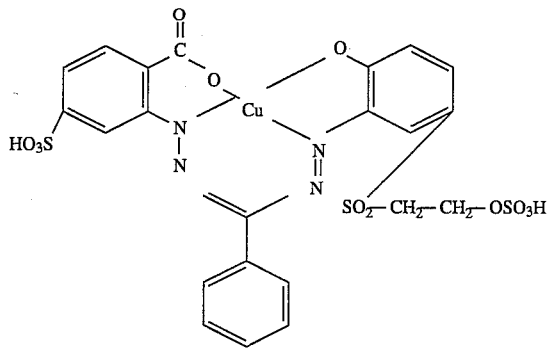

This dye may be prepared by an alternate synthesis route. The reactant, 2-methoxy-5(β-sulfatoethylsulfonyl) aniline may be used instead of 2-amino-4 -(β-sulfatoethylsulfonyl) phenol and the resulting product demethylated by heating the reaction mixture at pH 3–7 at 60° to 90° C. for 2 to 3 hours to obtain the desired dyestuff.

EXAMPLES 2–17

Table 1 shows the amount of dyes used in the different combination dyeings. The dyeing procedure was substantially the same as Example 1 for all examples.

TABLE 1

| Example # | Dyestuff | % owf | Shade of dyeing |
|---|---|---|---|
| 2 | Yellow 1 | 0.76 | Burgundy |
|   | Red 1 | 0.78 |   |
|   | Blue 1 | 0.32 |   |
| 3 | Yellow 1 | 0.77 | Chocolate |
|   | Red 1 | 0.30 |   |
|   | Blue 1 | 0.30 |   |
| 4 | Yellow 1 | 0.469 | Brown |
|   | Red 1 | 0.076 |   |
|   | Blue 1 | 0.142 |   |
| 5 | Yellow 1 | 0.181 | Taupe |
|   | Red 1 | 0.033 |   |
|   | Blue 1 | 0.078 |   |
| 6 | Yellow 1 | 0.027 | Beige |
|   | Red 1 | 0.0092 |   |
|   | Blue 1 | 0.0074 |   |
| 7 | Yellow 1 | 0.26 | Green |
|   | Red 1 | 0.023 |   |
|   | Blue 1 | 0.14 |   |
| 8 | Yellow 1 | 0.2 | Grey |
|   | Red 1 | 0.05 |   |
|   | Blue 1 | 0.164 |   |
| 9 | Yellow 1 | 0.22 | Rose |
|   | Red 1 | 0.11 |   |
|   | Blue 1 | 0.033 |   |
| 10 | Yellow 2 | 0.51 | Brown |
|   | Red 1 | 0.074 |   |
|   | Blue 1 | 0.142 |   |
| 11 | Yellow 2 | 0.78 | Burgundy |
|   | Red 1 | 0.76 |   |
|   | Blue 1 | 0.32 |   |
| 12 | Yellow 1 | 0.75 | Burgundy |
|   | Red 2 | 0.82 |   |
|   | Blue 1 | 0.32 |   |
| 13 | Yellow 1 | 0.77 | Chocolate |
|   | Red 2 | 0.35 |   |
|   | Blue 1 | 0.30 |   |

TABLE 1-continued

| Example # | Dyestuff | % owf | Shade of dyeing |
|---|---|---|---|
| 14 | Yellow 1 | 0.47 | Brown |
|   | Red 2 | 0.08 |   |
|   | Blue 1 | 0.142 |   |
| 15 | Yellow 3 | 0.18 | Rose |
|   | Red 1 | 0.11 |   |
|   | Blue 1 | 0.033 |   |
| 16 | Yellow 1 | 0.75 | Burgundy |
|   | Red 2 | 0.82 |   |
|   | Blue 2 | 0.35 |   |
| 17 | Yellow 2 | 0.47 | Brown |
|   | Red 2 | 0.08 |   |
|   | Blue 2 | 0.152 |   |

All dyeings were very level and uniform and are showing excellent light-, ozone, nitrous oxide, pesticide, shampoo and wet and dry crock fastness. In addition, all dyeings are showing an excellent on tone build up, which was tested in the same manner as described in Example #1.

EXAMPLE 18

A 20 g piece of Nylon-6,6 carpet was dyed by the continuous method using an aqueous dyeing liquor containing:

Yellow 1—0.17 g/l

Red 1—0.4 g/l

Blue 1—0.05 g/l

Hostapur® CX—1.5 g/l

DOSS-70—0.5 g/l

DOW FAX® 2A1—0.5 g/l

The pH of the dyeing liquor was adjusted to pH 4.0 with acetic acid and the equipment set for a pick up was set at 300–400% with steaming time of 10 minutes. The resulting dyeing was tan and the carpet had excellent levelness, light, ozone, nitrous oxide, pesticide, shampoo and wet and dry crock fastness. The dyeing also had a good chlorine fastness and almost no phototropism.

EXAMPLE 19–25

Table 2 shows the amount of dyes used in the following combination dyeings. The used dyeing procedure was substantially the same as Example #18.

TABLE 2

| Example # | Dyestuff | g/l | Shade of dyeing |
|---|---|---|---|
| 19 | Yellow 1 | 0.543 | Taupe |
|   | Red 1 | 0.099 |   |
|   | Blue 1 | 0.234 |   |
| 20 | Yellow 1 | 0.78 | Green |
|   | Red 1 | 0.069 |   |
|   | Blue 1 | 0.42 |   |
| 21 | Yellow 1 | 0.6 | Grey |
|   | Red 1 | 0.15 |   |
|   | Blue 1 | 0.492 |   |
| 22 | Yellow 1 | 0.66 | Rose |
|   | Red 1 | 0.33 |   |
|   | Blue 1 | 0.099 |   |
| 23 | Yellow 1 | 0.543 | Taupe |
|   | Red 2 | 0.085 |   |
|   | Blue 1 | 0.234 |   |
| 24 | Yellow 1 | 0.081 | Beige |
|   | Red 2 | 0.025 |   |
|   | Blue 1 | 0.0222 |   |
| 25 | Yellow 1 | 0.17 | Tan |
|   | Red 2 | 0.035 |   |

TABLE 2-continued

| Example # | Dyestuff | g/l | Shade of dyeing |
|---|---|---|---|
| | Blue 1 | 0.05 | |

All dyeings were very level and uniform and are showing excellent light, ozone, nitrous oxide, pesticide, shampoo and wet and dry crock fastness.

We claim:

1. A dye composition containing at least two dyes having different primary colors wherein said dyes are selected from dyes of the following formulae:

Primary Color - Yellow

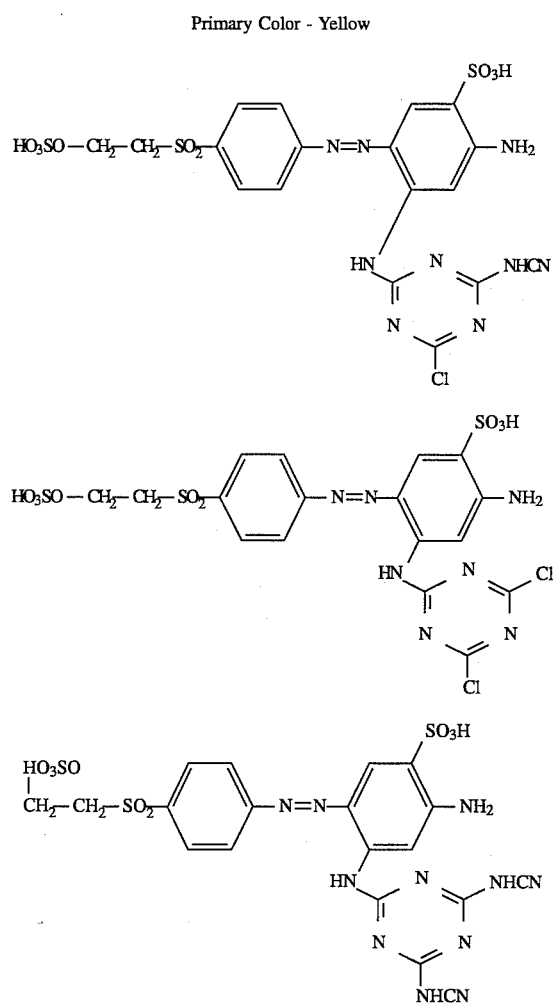

Primary Color - Red

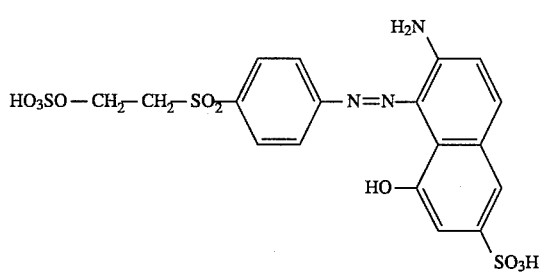

-continued

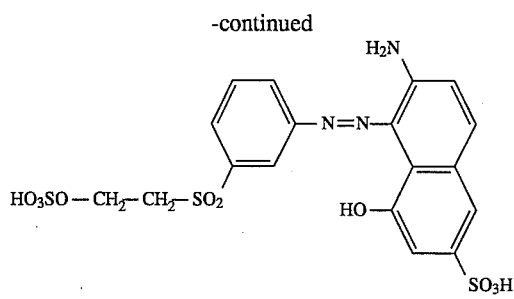

Primary Color - Blue

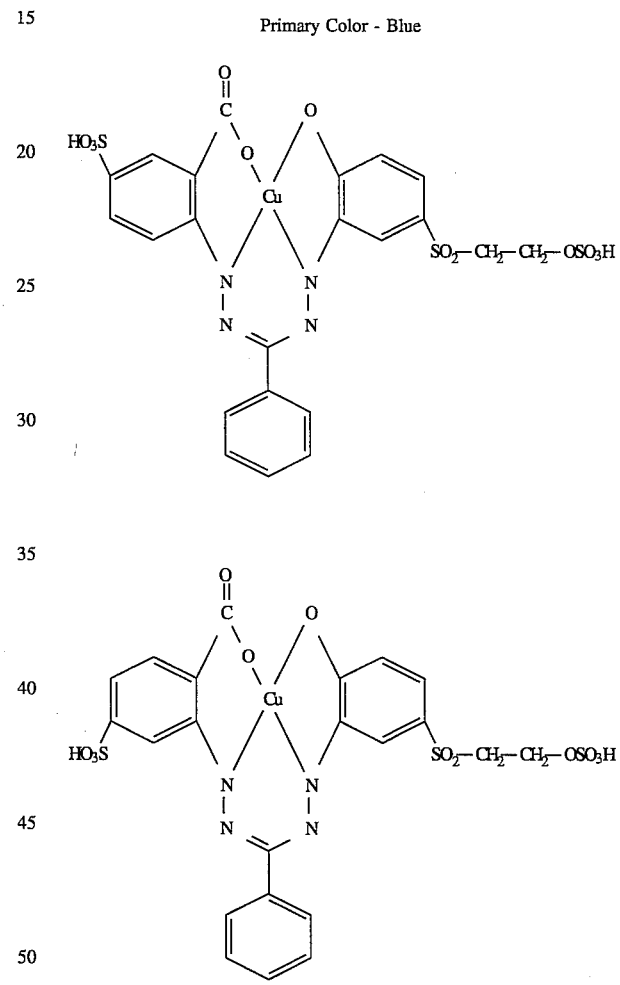

2. A dye composition according to claim 1 containing at least 3 dyes having different primary colors.

3. A method of dyeing a polyamide which comprises contacting a polyamide under dyeing conditions with a dye composition according to claim 1.

4. A method of dyeing a polyamide which comprises contacting a polyamide under dyeing conditions with a dye composition according to claim 2.

* * * * *